United States Patent [19]
Watabe et al.

[11] Patent Number: 5,973,096
[45] Date of Patent: Oct. 26, 1999

[54] PROCESS FOR PURIFYING A POLYETHER

[75] Inventors: Takashi Watabe; Hiroshi Hatano; Kazunori Chiba; Takao Doi; Toru Ueno; Etsuko Sakai; Minoru Yamada; Shinya Saiki; Hirotsugu Yamamoto; Toshihiko Higuchi, all of Yokohama, Japan

[73] Assignee: Asahi Glass Company Ltd., Tokyo, Japan

[21] Appl. No.: 08/991,549

[22] Filed: Dec. 16, 1997

Related U.S. Application Data

[62] Division of application No. 08/503,211, Jul. 17, 1995, Pat. No. 5,811,556.

[30] Foreign Application Priority Data

| Jul. 18, 1994 | [JP] | Japan | 6-165181 |
| Dec. 26, 1994 | [JP] | Japan | 6-323113 |

[51] Int. Cl.$^6$ ...................................................... C07F 7/08
[52] U.S. Cl. ........................... 528/15; 556/445; 568/699; 528/25; 528/29
[58] Field of Search .................... 556/445; 568/699; 528/15, 25, 29

[56] References Cited

U.S. PATENT DOCUMENTS

| 4,306,943 | 12/1981 | Mori et al. . |
| 4,987,271 | 1/1991 | Watabe et al. . |
| 5,223,583 | 6/1993 | Higuchi et al. . |
| 5,290,912 | 3/1994 | Watabe et al. . |
| 5,344,996 | 9/1994 | Nieh et al. . |
| 5,352,848 | 10/1994 | Cottrell . |
| 5,519,162 | 5/1996 | Agarwal et al. . |
| 5,565,068 | 10/1996 | Parker et al. . |
| 5,811,566 | 9/1998 | Watabe et al. ........................ 556/445 |

FOREIGN PATENT DOCUMENTS

| 0 059 368 | 9/1982 | European Pat. Off. . |
| 0 102 508 | 3/1984 | European Pat. Off. . |
| 0 283 298 | 9/1988 | European Pat. Off. . |
| 0 370 705 | 5/1990 | European Pat. Off. . |
| 0 383 333 | 8/1990 | European Pat. Off. . |
| 0 397 036 | 11/1990 | European Pat. Off. . |
| 0 459 151 | 12/1991 | European Pat. Off. . |
| 3-72527 | 3/1991 | Japan . |
| 3-88823 | 4/1991 | Japan . |
| 3-88824 | 4/1991 | Japan . |
| 5-97996 | 4/1993 | Japan . |
| WO 92/07813 | 5/1992 | WIPO . |

*Primary Examiner*—Paul F. Shaver
*Attorney, Agent, or Firm*—Oblon, Spivak, McClelland, Maier & Neustadt, P.C.

[57] ABSTRACT

A process for purifying a polyether, which comprises adding to a polyether (A) containing a first salt, water (B) and a compound (C) which is capable of reacting with an ion constituting the first salt to form a second salt which is essentially insoluble in the polyether (A), then removing water, followed by removing the second salt from the polyether (A).

2 Claims, No Drawings

PROCESS FOR PURIFYING A POLYETHER

This application is a division of application Ser. No. 08/563,211, filed Jul. 17, 1995, now U.S. Pat. No. 5,811,556.

The present invention relates to a purification method for removing a salt from a polyether containing the salt, and a hydrolyzable group-containing silicon group-containing polyether having improved storage stability, which is produced from the purified polyether.

With a hydroxyl group-containing polyether produced by reacting a monoepoxide to an initiator using, for example, a double metal cyanide complex compound or an aluminum porphyrin complex compound as a catalyst, the residue of a metal salt resulting from the catalyst used is likely to give adverse effects to the stability of the polyether itself, and a method for removing such a salt has been proposed (Japanese Unexamined Patent Publications No. 88823/1991 and No. 88824/1991).

Further, the residue of such salt is likely to give adverse effects to the stability of a secondary product produced by modifying the hydroxyl group-containing polyether, or to the subsequent chemical reaction employing such a polyether, and it is necessary to remove the salt. As a modifying method, a method may be mentioned wherein the hydroxyl group OR of the hydroxyl group-containing polyether is converted to OM (wherein M is an alkali metal) and then reacted with an organic halide to modify the hydroxyl group-containing polyether to obtain a modified product. Specifically, there may, for example, be mentioned a method wherein allyl chloride is reacted to modify the terminal to an ally group, or a method wherein methylene chloride is reacted to oligomerize the polyether.

An alkali metal halide produced as a by-product at that time will have to be thoroughly removed subsequently. However, the polyether produced by using a double metal cyanide complex compound catalyst is readily emulsifiable with water, and it is very difficult to remove the alkali metal halide by an extraction method.

Now, a specific example will be described with respect to a case for producing an unsaturated group-containing polyether having an unsaturated group such as an alkenyl group at its terminal.

An unsaturated group-containing polyether is a useful intermediate for a functional group-containing polyether, since various functional groups can be introduced by means of the unsaturated group and further by means of a chemical modification such as an addition reaction. Accordingly, its synthesis and purification method have heretofore been studied (Japanese Unexamined Patent Publications No. 97996/1993 and No. 72527/1991).

For example, it is a well known method that a hydroxyl group-containing polyether is reacted with an alkenyl chloride such as allyl chloride or methallyl chloride in the presence of an alkali catalyst to introduce a terminal alkenyl group.

In this method, when an alkali catalyst such as an alkali metal hydroxide or sodium metal is used for the reaction, an inorganic salt such as sodium chloride will be produced as a by-product. It is necessary to remove such a by-product inorganic salt and any remaining alkali catalyst when the alkali catalyst was used excessively. For this removal, a method of treatment with a suitable adsorbent, followed by filtration, a method of neutralization with various acids, followed by filtration of the resulting salt, and a method of extraction (extraction method) are generally known.

When the polyether has a high molecular weight, it is highly viscous, whereby its filtration is difficult. Further, when the polyether has a high molecular weight, the salt formed by neutralization tends to be finely dispersed and cannot be easily removed by filtration. Further, even with the extraction method, in the case of a polyether having a high molecular weight produced by means of a double metal cyanide complex compound catalyst, the polymer layer and the aqueous layer tend to form a creamy mixture whereby they cannot be separated by a simple method of washing with water, and even if a solvent is used, the polymer layer and the aqueous layer tend to form an emulsion, which cannot be easily be separated.

A method of diluting with a water-insoluble inorganic solvent and conducting liquid separation by a combination of control of the pH of the aqueous layer and use of a surfactant, has also been proposed, but this method has a substantial restriction such that it is hardly applicable to a polyether having a high hydrophilic nature.

Accordingly, it has been desired to establish a purification method which is not only applicable to an unsaturated group-containing polyether but also commonly applicable to a polyether having a high molecular weight having the above-described characteristics.

The present invention has been made to solve the above-described problems and provides a process for purifying a polyether, which comprises adding to a polyether (A) containing a first salt, water (B) and a compound (C) which is capable of reacting with an ion constituting the first salt to form a second salt which is essentially insoluble in the polyether (A), then removing water, followed by removing the second salt from the polyether (A).

Now, the present invention will be described in detail with reference to the preferred embodiments.

Polyether (A)

The polyether (A) in the present invention is preferably a hydroxyl group-containing polyether obtainable by reacting a monoepoxide to an initiator in the presence of a metal catalyst, or its modified product.

Hydroxyl group-containing polyether

The hydroxyl group-containing polyether is preferably the one obtainable by reacting a monoepoxide to an initiator in the presence of a metal catalyst.

The number of hydroxyl groups in the hydroxyl group-containing polyether is at least 1, usually from 1 to 6, preferably from 1 to 4, more preferably from 2 to 4.

The initiator is a compound having a number of active hydrogen atoms (hydrogen atoms of hydroxyl groups or amino groups), which corresponds to the number of the above hydroxyl groups. It may, for example, be an at least monovalent alcohol or phenol.

The initiator is preferably a monovalent to hexavalent alcohol or its alkylene oxide adduct (a polyoxyalkylenepolyol having a molecular weight lower than the desired product). However, it is not limited to such specific examples. For example, an monovalent to hexavalent carboxylic acid, an amine or a thiol may also be used. When an unsaturated group-containing polyether is to be produced, it is preferred to use a monovalent initiator having an unsaturated group, such as an alkenyl alcohol (such as allyl alcohol or methallyl alcohol). Bivalent and higher valent initiators include, for example, the following compounds: ethylene glycol, diethylene glycol, propylene glycol, dipropylene glycol, other polyoxypropylene glycols, butane diol, glycerol, trimethylol propane, pentaerythritol, sorbitol, bisphenol A and their alkylene oxide adducts.

The monoepoxide may, for example, be an alkylene oxide such as ethylene oxide, propylene oxide, butylene oxide, hexylene oxide or ethylene oxide. Oxetane or tetrahydrofuran may also be used. A $C_{2-6}$ alkylene oxide is preferred. Particularly preferred is a single use of propylene oxide, a combined use of propylene oxide with a small amount of other alkylene oxide having at least 3 carbon atoms, or a combined use of propylene oxide with ethylene oxide.

The hydroxyl value based molecular weight of the hydroxyl group-containing polyether is usually at least 1000, preferably from 3,000 to 50,000, more preferably from 5,000 to 30,000, most preferably from 8,000 to 30,000. Here, the hydroxyl value based molecular weight is a molecular weight represented by a product obtained by multiplying the molecular weight per hydroxyl group of the hydroxyl group-containing polyether by the number of active hydrogen of the initiator used for the preparation of the hydroxyl group-containing polyether.

The metal catalyst to be used as the catalyst, is preferably a double metal cyanide complex compound catalyst, a porphyrin metal complex compound catalyst and/or an alkali catalyst.

As a catalyst to be used for the preparation of a hydroxyl group-containing polyether, an alkali catalyst such as a sodium type catalyst or a potassium type catalyst is well known. The alkali catalyst is usually made of an alkali metal or an alkali metal compound and is believed to provide a catalytic activity by converting a hydroxyl group OH to OM (wherein M is an alkali metal). However, when a sodium type catalyst or a potassium type catalyst is used as the alkali catalyst, the upper limit of the molecular weight of the hydroxyl group-containing polyether is limited due to a side-reaction, and the molecular weight is at a level of 4,000 at best in the case of a diol.

In order to produce a product having a higher molecular weight, it is preferred to use a cesium type catalyst among alkali catalysts, or a complex catalyst such as a double metal cyanide complex compound catalyst or a porphyrin metal complex compound catalyst. It is particularly preferred to use a double metal cyanide complex compound catalyst.

The double metal cyanide complex compound is preferably a complex compound comprising zinc hexa cyano cobaltate as the main component, and its ether and/or alcohol complex compound is particularly preferred. Its composition may be essentially the one disclosed in Japanese Examined Patent Publication No. 27250/1971. As the ether, ethylene glycol dimethyl ether (glyme) or diethylene glycol dimethyl ether (diglyme) is, for example, preferred. Particularly preferred is glyme from the viewpoint of easiness in handling at the time of preparation of the complex compound. As the alcohol, t-butanol is preferred.

The present invention is preferred as a method for purifying a hydroxyl group-containing polyether containing a salt attributable to a metal catalyst, which is obtained by reacting a monoepoxide to an initiator in the presence of the metal catalyst.

For example, a polyether obtainable by reacting a monoepoxide to an initiator using an alkali catalyst, contains a salt attributable to the alkali catalyst. On the other hand, when a double metal cyanide complex compound is used, a salt of metal such as zinc, cobalt or iron will remain in the polyether. When an aluminum porphyrin complex compound is used, an aluminum salt will remain in the polyether. The present invention is suitable as a process for removing these salts.

Modified product of the hydroxyl group-containing polyether

The process of the present invention is suitable also as a process for purifying a modified product of the hydroxyl group-containing polyether. Namely, after modifying the hydroxyl group-containing polyether, the process of the present invention may be used for purification. In this case, it is possible to remove a salt attributable to the catalyst used at the time of purifying the hydroxyl group-containing polyether, or a salt attributable to the catalyst or other compounds used at the time of modifying the hydroxyl group-containing polyether.

The modified product of the hydroxyl group-containing polyether may, for example, be a terminal modified product or an oligomerized product. As the terminal modified product, a polyether may, for example, be mentioned which is obtainable by converting the hydroxyl group-containing polyether to an alkali metal alkoxide, followed by reacting it with a halogenated hydrocarbon.

As the oligomerized product, an oligomerized polyether may, for example, be mentioned which is obtainable by converting the hydroxyl group-containing polyether to an alkali metal alkoxide, followed by reacting a polyhalogenated hydrocarbon thereto.

Here, "converting the hydroxyl group-containing polyether to an alkali metal alkoxide" means that "the hydroxyl group OH of the hydroxyl group-containing polyether is converted to OM (wherein M is an alkali metal", the same applies hereinafter).

An unsaturated group-containing polyether as one of the terminal modified products, is obtainable by converting the hydroxyl group-containing polyether to an alkali metal alkoxide, followed by reacting an unsaturated group-containing halogenated hydrocarbon thereto.

Namely, an unsaturated group-containing polyether can be obtained by reacting the hydroxyl group-containing polyether with an alkali metal, an alkali metal hydride, a metal alkoxide or an alkali metal hydroxide to convert OH to OM (wherein M is an alkali metal), followed by reacting it with an unsaturated group-containing halogenated hydrocarbon.

Otherwise, an unsaturated group-containing polyether can be obtained by a method wherein the hydroxyl group-containing polyether is reacted with an unsaturated group-containing halogenated hydrocarbon in the presence of an alkali catalyst.

By the above method, an unsaturated group-containing polyether containing an alkali metal halide i.e. a metal salt, will be obtained. The present invention is a purification process which is suitable to remove such a metal salt.

The alkali metal may, for example be sodium, potassium or cesium. The alkali metal hydride may, for example, be sodium hydride. The metal alkoxide may, for example, be NaOR or LiOR (wherein R is an alkyl group such as ethyl, propyl, isopropyl or butyl). The alkali metal hydroxide may, for example, be sodium hydroxide, potassium hydroxide, lithium hydroxide or secium hydroxide.

The unsaturated group-containing halogenated hydrocarbon may, for example, be a polyhalogenated unsaturated hydrocarbon having at most 4 carbon atoms, or a monohalogenated unsaturated hydrocarbon having at most 10 carbon atoms.

The halogen may, for example, be chlorine or bromine. Particularly preferred is a $C_{1-2}$ dichloro unsaturated hydrocarbon or a monochloro unsaturated hydrocarbon having at most 6 carbon atoms. As mentioned above, most preferred is an alkenyl halide, particularly an alkenyl chloride or an alkenyl bromide. As the alkenyl halide, particularly preferred is allyl chloride, methallyl chloride or allyl bromide. Further, chloromethylstyrene may also be mentioned.

The conversion of the hydroxyl group of the hydroxyl group-containing polyether to the unsaturated group can optionally be changed by changing the amount of the unsaturated group-containing halogenated hydrocarbon used. The unsaturated group-containing halogenated hydrocarbon may be used in an optional equivalent to the hydroxyl group of the hydroxyl group-containing polyether. However, in a case where all the hydroxyl groups are to be converted to unsaturated groups, it is used in an excess equivalent amount relative to the hydroxyl groups. The upper limit of the equivalent amount is usually 1.3 times in equivalent.

The number of unsaturated groups per molecule in the resulting unsaturated group-containing polyether is usually from 1.6 to 6, preferably from 1.8 to 3. Further, the resulting unsaturated group-containing polyether may contain a hydroxyl group which is not converted to the unsaturated group.

Further, in the production of a polyether monool, it is possible to produce a polyether monool by using a monovalent initiator having an unsaturated group such as allyl alcohol or methallyl alcohol, and converting its hydroxyl group to an unsaturated group by the above-mentioned method to obtain a polyether having a high molecular weight wherein the number of unsaturated groups exceeds 1.

Further, a polyether can be oligomerized by converting the hydroxyl group-containing polyether to an alkali metal alkoxide, followed by reacting a polyhalogenated hydrocarbon such as methylene chloride thereto. Also by this method, a polyether containing an alkali metal halide, i.e. a metal salt, will be obtained. The present invention is a purification process which is suitable to remove such a metal salt.

The amount of the above alkali metal halide usually decreases as the resulting polyether has a high molecular weight. The amount is usually at most 5 wt %, in many cases at most 2 wt %, relative to the resulting polyether having a high molecular weight. The lower limit varies depending upon the necessity for purification, and is usually at a level of 0.1 wt %.

Further, the hydroxyl group-containing polyether to be used for modification can be produced by using the above-mentioned metal catalyst. It may be a modified polyol without purification after the production by means of the metal catalyst, or a modified polyether purified after the production by means of the metal catalyst. A non-purified polyether is preferred.

When a non-purified polyether is employed, it contains the alkali metal halide and a salt attributable to the metal catalyst used for the production of the hydroxyl group-containing polyether.

For example, when a polyether produced by using a double metal cyanide complex compound as the catalyst, is employed without purification, the resulting modified product will contain an alkali metal halide and a salt of a metal such as zinc, cobalt or iron. When an aluminum porphyrin complex compound is used as the catalyst, the resulting modified product will contain an aluminum salt and an alkali metal halide.

Further, when a polyether produced by using an alkali catalyst is employed without purification, it can be reacted with an organic halide in the presence of the alkali catalyst, and the resulting modified product will contain an alkali metal halide.

The first salt contained in the polyether (A) to be purified by the process of the present invention preferably contains a zinc salt and an alkali metal salt represented by an alkali metal halide.

The present invention is particularly preferred as a process for purifying a polyether (A) which is an unsaturated group-containing polyether obtained by reacting a monoepoxide to an initiator in the presence of a metal catalyst to obtain a hydroxyl group-containing polyether, then converting the hydroxyl group-containing polyether to an alkali metal alkoxide, followed by reacting an unsaturated group-containing halogenated hydrocarbon thereto.

Purification process

In the present invention, to a polyether (A) containing a first salt, water (B) and a compound (C) which is capable of reacting with an ion constituting the first salt to form a second salt which is essentially insoluble in the polyether (A), are added, then water is removed, followed by removal of the second salt from the polyether (A).

Compound (C)

When the first salt contained in the polyether (A) is an alkali metal salt such as a sodium salt, a potassium salt, a lithium salt or a cesium salt, the compound (C) may, for example, be hydrochloric acid, sulfuric acid, nitric acid, boric acid, perchloric acid, phosphoric acid, pyrophosphoric acid, acid pyrophosphate or sodium hydrogencarbonate. However, the compound (C) is not limited to such specific examples, and it may be any compound so long as the second salt formed by e.g. neutralization is not essentially soluble in the polyether (A).

When the first salt contained in the polyether (A) is a zinc salt, a cobalt salt, an iron salt, a nickel salt or an aluminum salt, the compound (C) may, for example, be sulfuric acid, pyrophosphoric acid, an acid pyrophosphate or a sodium hydrogencarbonate. An acid pyrophosphate is particularly preferred.

The compound (C) is preferably an acid pyrophosphate or a combination of an acid pyrophosphate with other compound. Particularly preferred is a combination of an acid pyrophosphate with hydrochloric acid and/or sulfuric acid.

For example, when the polyether (A) contained both an alkali metal salt such as a sodium salt, a potassium salt or a lithium salt, and a metal salt such as a zinc salt, a cobalt salt, an iron salt or an aluminum salt, hydrochloric acid or sulfuric acid in an amount of at least equivalent to the alkali metal salt and an acid pyrophosphate in an amount slightly in excess to the remaining metal salt, may be used in combination.

Especially when an alkali metal salt is in a large amount and the pH of the polyether (A) before purification exceeds 12, it is preferred to use a combination of an acid pyrophosphate with hydrochloric acid and/or sulfuric acid. Specifically, it is preferred that hydrochloric acid or sulfuric acid is added to the polyether (A) to adjust the pH to a level of from 8 to 10, and then an acid pyrophosphate is added thereto.

Among acid pyrophosphates, disodium dihydrogen pyrophosphate ($Na_2H_2P_2O_7$) is particularly preferred.

Water (B)

In the present invention, water (B) is used. Use of water (B) is particularly effective when it is feared that the first salt will partially precipitate due to the content of the first salt contained in the polyether (A) to be purified or due to the polarity of the polyether (A).

The amount of the water (B) varies depending upon the amount of the first salt contained in the polyether (A), but is usually within a range of from 0.05 to 50 wt %, preferably from 1 to 10 wt %, based on the polyether (A). If the amount is less than 0.05 wt %, the second salt precipitating after removal of water will not be sufficiently large, and it tends to be difficult to remove the second salt. On the other hand, if it exceeds 50 wt %, the time and heat required for the step of removing water will be substantial, such being uneconomical. Further, it is not necessary to completely dissolve the first salt in the polyether (A) with water (B), and water may be in an amount smaller than the amount required to completely dissolve the first salt. Water may be added in an excess amount.

In the present invention, it is effective to conduct stirring for from 1 to 24 hours, preferably from 6 to 10 hours, after addition of the water (B), to improve the purification degree and to facilitate removal of the second salt by the subsequent filtration or the like.

Addition of the water (B) may be before or after addition of the compound (C). It is particularly preferred to add the water (B) after addition of the compound (C).

When the pH is adjusted by means of hydrochloric acid and/or sulfuric acid, it is particularly preferred to add the water (B) after adjusting the pH by addition of hydrochloric acid or the like.

Addition of a surfactant

In the present invention, a surfactant (D) may be added together with the water (B) and the compound (C). As the surfactant, a nonionic surfactant is preferred. In a case where the polyether (A) to be purified, does not contain a polyoxyethylene chain, it is advisable to use a nonionic surfactant.

As the nonionic surfactant, a commonly known surfactant may be employed. As such a nonionic surfactant, a compound having at least 5 wt % of an oxyethylene chain in its molecule, is preferred. However, other surfactants may also be used. The amount of the nonionic surfactant is usually from 0.01 to 10 wt %, based on the polyether (A).

When the polyether (A) contains no oxyethylene chain, if the amount of the nonionic surfactant is less than 0.01 wt %, and if it is attempted to remove a subsequently precipitated second salt, it is likely that the second salt will remain in the polyether (A), or the second salt will be in a finely dispersed state, whereby it becomes very difficult to remove the second salt from the polyether (A). On the other hand, if the amount of the nonionic surfactant exceeds 10 wt %, a substantial amount of the nonionic surfactant will remain in the polyether (A) after the purification, such being undesirable.

In a case where the polyether (A) to be purified is a polyether which by itself contains at least 0.01 wt % of a polyoxyethylene chain, such a polyether itself has such a surface active effect, and therefore addition of a nonionic surfactant is not essential, but purification may still be made with an addition of a nonionic surfactant. There may be a case where a good result can be obtained by using no nonionic surfactant or by using a smaller amount of the nonionic surfactant.

As the nonionic surfactant which may be used in the present invention, the following specific examples may be mentioned, but the useful surfactant is not limited thereto.

A polyoxyethylene aliphatic alkylether, a polyoxyethylene polyoxypropylene aliphatic alkylether, polyoxyethylene alkylphenyl ether, a polyoxyethylene monoaliphatic carboxylic acid ester, a sorbitan mono- or poly-fatty acid ester, a polyoxyethylene sorbitan mono-fatty acid ester, a polyoxyethylene oxypropylene block copolymer, an oxyethylene or polyoxyethylene aliphatic amine, a fatty acid dialkanol amide, a glycerol mono-fatty acid ester, a polyglycerol fatty acid ester, a propylene glycol fatty acid ester, a pentaerythritol fatty acid ester, etc.

Method for removing the second salt

As a method for removing the second salt, a commonly known method may be employed. As such a method, a filtration method, a centrifugal separation method or a stand-still sedimentation method may, for example, be mentioned.

In a case where the molecular weight of the polyether (A) is high, and the viscosity is accordingly high, if removal of the second salt is not easy, it is possible to employ a method of diluting with a solvent or a method of heating.

In the method of diluting with a solvent, it is essential that the solvent to be used does not dissolve the second salt, but there is no other particular limitation. Specifically, the following solvents may be used, but the useful solvent is not limited to such specific examples.

An aliphatic hydrocarbon solvent such as hexane, heptane or octane, an alicyclic hydrocarbon solvent such as cyclohexane or methylcyclohexane, an aromatic hydrocarbon solvent such as benzene, toluene or xylene, a halogenated hydrocarbon solvent such as dichloromethane, trichloroethylene or tetrachloroethylene, and a halogenated aromatic hydrocarbon solvent such as chlorobenzene or dichlorobenzene.

The method of heating is a method wherein the liquid of the polyether (A) containing the second salt is heated to a temperature of from 50 to 140° C. to reduce the liquid viscosity.

Use of an adsorbent

In the present invention, the first salt contained in the polyether (A) to be purified is converted to a second salt which is essentially insoluble in the polyether (A) and then removed to obtain a polyether having a high purity. However, a commonly known adsorbent may be used to prevent a very small amount of ions, an acid or a base remaining in the purification step.

As such an adsorbent, a natural and/or synthetic adsorbent known as a solid ion exchanger, such as activated clay, magnesium silicate, alumino silicate, aluminum magnesium oxide or hydrotalcite, or an ion exchange resin may, for example, be mentioned. However, the useful adsorbent is not limited to such specific examples. For removal of such a solid adsorbent, it is possible to employ a method similar to the method of removing the second salt from the polyether (A).

The above adsorbent may be added to the polyether (A) after removing the second salt, or it may be added to the polyether (A) containing the second salt. The latter is preferred, since both the second salt and the adsorbent can be simultaneously removed by a single operation. In such a case, the adsorbent may be added before initiation of removal of water, or at a time when water removal has proceeded to some extent, or at the time when water removal has completed. It is preferred to add the adsorbent during a period from a time when water removal has proceeded to some extent to immediately prior to completion of water removal.

Hydrolyzable group-containing silicon group-containing polyether

The most suitable polyether (A) to which the purification process of the present invention is applied, is the above-mentioned unsaturated group-containing polyether. The unsaturated group-terminated polyether purified by the purification process of the present invention is useful, since it can be used for various applications by modifying the terminal unsaturated group to another group.

Especially, a hydrolyzable group-containing silicon group-containing polyether obtained by reacting a silicon compound (E) containing a silicon atom, to which a hydrogen atom and a hydrolyzable group are directly bonded, to an unsaturated group-terminated polyether, will be crosslinked and cured by a curing catalyst and moisture to give an elastomer and thus is a compound useful as the starting material for a sealant or an adhesive.

Namely, the present invention is the following invention:

A process for producing a hydrolyzable group-containing silicon group-containing polyether, which comprises adding to a polyether (A-1) containing a first salt, water (B) and a compound (C) which is capable of reacting with an ion constituting the first salt to form a second salt which is essentially insoluble in the polyether (A-1), then removing water, followed by removing the second salt from the polyether (A-1) to purify the polyether (A-1), and then reacting thereto a silicon compound (E) containing a silicon atom to which a hydrogen atom and a hydrolyzable group are directly bonded, in the presence of a catalyst comprising a Group 8 metal or its compound, wherein the polyether (A-1) is an unsaturated group-containing polyether obtained by reacting a monoepoxide to an initiator in the presence of a metal catalyst to obtain a hydroxyl group-containing polyether, then converting the hydroxyl group-containing polyether to an alkali metal alkoxide, followed by reacting an unsaturated group-containing halogenated hydrocarbon thereto.

Polyether (A-1)

This is an unsaturated group-containing polyether obtained by reacting a monoepoxide to an initiator in the presence of a metal catalyst to obtain a hydroxyl group-containing polyether, then converting the hydroxyl group-containing polyether to an alkali metal alkoxide, followed by reacting an unsaturated group-containing halogenated hydrocarbon thereto.

As the silicon compound (E) containing a silicon atom to which a hydrogen atom and a hydrolyzable group are directly bonded, a compound of the formula Ka-1 can be used.

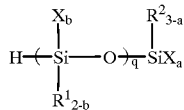

wherein a is an integer of from 0 to 3, b is an integer of from 0 to 2, q is an integer of at least 0, provided that $1 \leq a+qb$, each of $R^1$ and $R^2$ which may be the same or different, is a $C_{1-20}$ monovalent hydrocarbon group or a halogenated hydrocarbon group, and X is hydroxyl group or a hydrolyzable group.

Preferably, a is 2 or 3, and q is preferably 0. $R^1$ is preferably an alkyl group, a phenyl group or a fluoroalkyl group having at most 8 carbon atoms. Particularly preferably, it is a methyl group, an ethyl group, a propyl group, a butyl group, a hexyl group, a cyclohexyl group or a phenyl group.

X is a hydroxyl group or a hydrolyzable group. As the hydrolyzable group, a halogen atom, an alkoxy group, an acyloxy group, an amide group, an amino group, an aminoxy group, a ketoximate group or a hydride group may, for example, be mentioned. The carbon number of a hydrolyzable group having carbon atoms, among them, is preferably at most 6, particularly at most 4. X is preferably a lower alkoxy group having at most 4 carbon atoms, and particularly preferred is a methoxy group, an ethoxy group or a propoxy group.

As such a silicon compound (E), the following specific examples may be mentioned, but the useful compound is not limited to such specific examples:

Trimethoxy silane, triethoxy silane, triisopropenyloxy silane, triacetoxy silane, triphenoxy silane, trichloro silane, methyldimethoxy silane, methyldiethoxy silane, methyldi- isopropenyloxy silane, methyldiphenyloxy silane, methyldiacetoxy silane, methyldichloro silane, diemethylmethoxy silane, dimethylethoxy silane, dimethylisopropenyloxy silane, dimethylacetoxy silane, dimethylphenoxy silane, dimethylchloro silane, etc.

Further, the hydrolyzable group directly bonded to a silicon atom may be changed to other hydrolyzable group by a known method.

As the catalyst comprising a Group 8 metal or its compound, a known catalyst made of a Group 8 metal or its compound can be used. A preferred catalyst is a platinum metal compound. Specifically, chloroplatinic acid, a platinum olefin complex, or a platinum vinyl siloxane complex may, for example, be mentioned.

The above addition reaction readily proceeds by mixing the unsaturated group-containing polyether, the catalyst and the silicon compound (E), followed by heating. The reaction temperature may be selected at an optional level so long as the reaction proceeds. It is usually preferred that the reaction temperature is within a range of from 50° C. to 120° C. from the viewpoint of the reaction rate and operation efficiency.

In this addition reaction, no solvent may be used. However, a solvent may be used as the case requires. Such a solvent is not particularly limited so long as it does not adversely affect the reaction. Specifically, useful solvents include hydrocarbon solvents such as hexane and toluene, one ether type solvents such as diethyl ether, tetrahydrofuran and ethylene glycol dimethyl ether. However, useful solvents are not limited to such specific examples.

The hydrolyzable group-containing silicon group-containing polyether of the present invention has a hydrolyzable group-containing silicon group of the formula Ka-2:

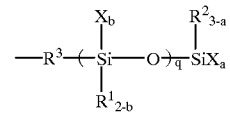

wherein a, b, q, $R^1$, $R^2$ and X are as defined above, and $R^3$ is a bivalent organic group.

Curable composition

One of embodiments of the present invention is a curable composition containing a hydrolyzable group-containing silicon group-containing polyether prepared by the above process.

The hydrolyzable group-containing silicon group-containing polyether (hereinafter referred to as a polyether (A-2)) produced from the unsaturated group-containing polyether purified by the purification process of the present invention, has a characteristic that it contains little impurities such as metal salts.

Further, the present invention provides a curable composition containing a hydrolyzable group-containing silicon group-containing polyether wherein the total amount of ionic impurities is at most 50 ppm.

The total amount of ionic impurities is preferably at most 30 ppm, more preferably at most 20 ppm.

Here, the ionic impurities include all anions and cations, for example, cations and anions such as zinc ions, cobalt ions, cyan ions and chlorine ions attributable to the metal catalyst, alkali metal ions such as sodium ions and potassium ions, halogen ions, and carboxylate ions formed by oxidation of the polyether.

The curable composition in the present invention has an excellent property such that the viscosity will not increase even when stored for an extended period of time, since a polyether containing little impurities is used as mentioned above.

The curable composition of the present invention may contain the following additives. Now, the additives will be described.

Filler

As a filler, known fillers may be employed. The amount of the filler is usually from 0 to 1,000 wt %, preferably from 50 to 250 wt %, based on the polyether (A-2). Specific examples of the filler include the following, and these fillers may be used alone or in combination as a mixture of two or more of them:

Calcium carbonates such as calcium carbonate having its surface treated with a fatty acid or a resin acid-type organic substance, glue-like calcium carbonate having an average particle size of at most 1 $\mu$m prepared by finely pulverizing the surface treated calcium carbonate, light-weight calcium carbonate having an average particle size of from 1 to 3 $\mu$m prepared by a precipitation method, or heavy-weight calcium carbonate having an average particle size of from 1 to 20 $\mu$m, fumed silica, precipitated silica, silicic anhydride, hydrous silicic acid, powdery fillers such as carbon black, magnesium carbonate, diatomaceous earth, calcined clay, clay, talc, titanium oxide, bentonite, organic bentonite, ferric oxide, zinc oxide, active zinc white, sillus balloon, wood powder, pulp, cotton chips, mica, wallnut shell powder, hull powder, graphite, aluminum fine powder and flint powder, as well as fibrous fillers such as asbestos, glass fibers, glass filaments, carbon fibers, Kevler fibers and polyethylene fibers.

Plasticizer

As a plasticizer, a known plasticizer can be used. The amount of the plasticizer is preferably from 0 to 100 wt %, based on the polyether (A-2). Specific examples of the plasticizer include the following plasticizers:

Phthalic acid esters such as dioctyl phthalate, dibutyl phthalate and butylbenzyl phthalate; aliphatic carboxylic acid esters such as dioctyl adipate, diisodecyl succinate, dibutyl sebacate and butyl oleate; alcohol esters such as pentaerythritol ester; phosphoric acid esters such as trioctyl phosphate and tricresyl phosphate; epoxy plasticizers such as epoxydized soybean oil, dioctyl 4,5-epoxyhexahydrophthalate and benzyl epoxystearate; chlorinated paraffins; polyester type plasticizers such as polyesters made of dibasic acids and dihydric alcohols; polymer plasticizers, for example, polyethers such as polyoxypropylene glycol and its derivatives, oligomers of a polystyrene such as poly-$\alpha$-methylstyrene or polystyrene, and oligomers of e.g. polybutadiene, butadiene-acrylonitrile copolymer, polychloroprene, polyisoprene, polybutene, hydrogenated polybutene and epoxydized polybutadiene.

Cure-promoting catalyst

For curing the curable composition of the present invention, a cure-promoting catalyst which accelerates the curing reaction of the hydrolyzable group-containing silicon group, may be employed. Specific examples include the following compounds. One or more of them may be employed. The cure-promoting catalyst is used preferably in an amount of from 0 to 10 wt %, based on the polyether (A-2):

Metal salts such as alkyl titanates, organic silicon titanates, and bismuth tris-2-ethylhexoate; acidic compounds such as phosphoric acid, p-toluene sulfonic acid and phthalic acid; aliphatic monoamines such as butylamine, hexylamine, octylamine, decylamine and laurylamine; aliphatic diamines such as ethylene diamine and hexane diamine; aliphatic polyamines such as diethylene triamine, triethylene tetramine and tetraethylene pentamine; heterocyclic amines such as piperidine and piperazine; aromatic amines such as metaphenylene diamine; and amine compounds such as ethanol amine, triethylamine and various modified amines useful as curing agents for epoxy resins.

Mixtures of the above amines with bivalent tin compounds such as tin dioctyl acid, tin dinaphthanate and tin distearate.

Dibutyltin diacetate, dibutyltin dilaurate, dioctyltin dilaurate, and the following carboxylic acid type organotin compounds, as well as mixtures of the above amines with these carboxylic acid type organotin compounds:

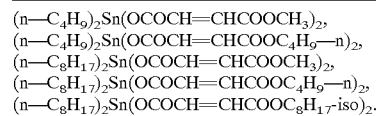

The following sulfur-containing type organotin compounds:

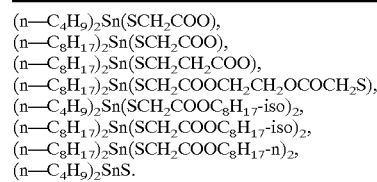

Organotin oxides such as (n-$C_4H_9$)$_2$SnO and (n-$C_8H_{17}$)$_2$SnO, as well as reaction products of these organotin oxides with ester compounds such as ethyl silicate, dimethyl maleate, diethyl maleate, dioctyl maleate, dimethyl phthalate, diethyl phthalate and dioctyl phthalate.

The following chelate tin compounds as well as reaction products of these tin compounds with alkoxy silanes (in the following formula acac represents an acetylacetonate ligand):

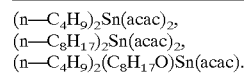

The following tin compounds:

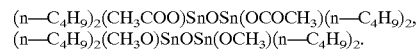

Adhesive property-imparting agent

Adhesive property-imparting agents may be employed for the purpose of improving the adhesive property. These adhesive property-improving agents include, for example, silane coupling agents such as (meth)acryloxy group-containinig silanes, amino group-containing silanes, mercapto group-containing silanes, epoxy group-containing silanes and carboxyl group-containing silanes.

The (meth)acryloyloxy group-containing silanes include, for example, $\gamma$-methacryloyloxypropyltrimethoxy silane, $\gamma$-acryloyloxypropyltrimethoxy silane, and $\gamma$-methacryloyloxypropylmethyldimethoxy silane.

The amino group-containing silanes include, for example, $\gamma$-aminopropyltrimethoxy silane, $\gamma$-aminopropyltriethoxy silane, $\gamma$-aminopropylmethyldimethoxy silane, N-($\beta$-aminoethyl)-$\gamma$-aminopropyltrimethoxy silane, N-($\beta$-aminoethyl)-$\gamma$-aminopropylmethyldimethoxy silane, N-($\beta$-aminoethyl)-$\gamma$-aminopropyltriethoxy silane, γ-ureidopropyltriethoxy silane, N-(N-vinylbenzyl-β-aminoethyl)-γ-aminopropyltrimethoxy silane and γ-anilinopropyltrimethoxy silane.

The mercapto group-containing silanes include, for example, γ-mercaptopropyltrimethoxy silane, γ-mercaptopropyltriethoxy silane, γ-mercaptopropylmethyldimethoxy silane and γ-mercaptopropylmethyldiethoxy silane.

The epoxy group-containing silanes include, for example, γ-glycidyloxypropyltrimethoxy silane, γ-glycidyloxypropylmethyldimethoxy silane and γ-glycidyloxypropyltriethoxy silane.

The carboxyl group-containing silanes include, for example, β-carboxyethyltriethoxy silane, β-carboxyethylphenylbis(β-methoxyethoxy)silane, and N-(N-carboxymethyl-β-aminoethyl)-γ-aminopropyltrimethoxy silane.

Further, it is also possible to employ a reaction product obtained by reacting two or more silane coupling agents. Specific examples of such a reaction product include a reaction product of an amino group-containinig silane with an epoxy group-containing silane, a reaction product of an amino group-containing silane with a (meth)acryloyloxy group-containing silane, a reaction product of an epoxy group-containing silane with a mercapto group-containinig silane, and a reaction product of mercapto group-containing silanes to each other. These reaction products may readily be obtained by mixing such silane coupling agents and stirring the mixtures within a temperature range of from room temperature to 150° C. for from 1 to 8 hours.

The above compounds may be used alone or in combination as a mixture of two or more of them. The amount of the silane coupling agent is preferably from 0 to 30 wt %, based on the polyether (A-2).

As an adhesive property-imparting agent, an epoxy resin may be incorporated. Further, as the case requires, it may be used in combination with an epoxy resin-curing agent. As the epoxy resin which may be incorporated to the composition of the present invention, common epoxy resins may be used. Specifically, the following resins may be mentioned. The amount is preferably from 0 to 100 wt %, based on the polyether (A-2).

Commonly employed epoxy resins and epoxy group-containing vinyl type polymers including for example, an epichlorohydrin-bisphenol A type epoxy resin, an epichlorohydrin-bisphenol F type epoxy resin, a nonflammable epoxy resin such as a glycidyl ether of tetrabromobisphenol A, a novolak type epoxy resin, a hydrogenated bisphenol A type epoxy resin, a glycidyl ether type epoxy resin of a bisphenol A propylene oxide adduct, a diglycidyl ester type epoxy resin such as glycidyl 4-glycidyloxybenzoate, diglycidyl phthalate, diglycidyl tetrahydrophthalate or diglycidyl hexahydrophthalate, a m-aminophenol type epoxy resin, a diaminodiphenylmethane type epoxy resin, a urethane-modified epoxy resin, various alicyclic epoxy resins, N,N-diglycidylaniline, N,N-glycidyl-o-toluidine, triglycidyl isocyanurate, polyalkylene glycol diglycidyl ether, a glycidyl ether of a polyhydric alcohol such as glycerol, a hydantoin type epoxy resin, an epoxidized product of an unsaturated polymer such as a petroleum resin.

Further, to the composition of the present invention, a curing agent (or a curing catalyst) for the above epoxy resins may be incorporated. As such a curing agent, a commonly employed curing agent for epoxy resins may be used. Specifically, the following curing agents may be mentioned. The amount is preferably from 0.1 to 300 wt %, based on the epoxy resin.

Amines or their salts, such as triethylenetetramine, tetraethylenepentamine, diethylaminopropylamine, N-aminoethylpiperazine, N-xylylene diamine, m-phenylene diamine, diaminodiphenylmethane, diaminodiphenylsulfone, isophorone diamine and 2,4,6-tris(dimethylaminomethyl)phenol, polyamide resins, imidazols, dicyandiamides, boron trifluoride complex compounds, carboxylic anhydrides such as phthalic anhydride, hexahydrophthalic anhydride, tetrahydrophthalic anhydride, dodecenyl succinic anhydride and pyromellitic anhydride, phenoxy resins, carboxylic acids, alcohols, polyalkylene oxide type polymers having at least one group reactive with an epoxy group in its molecule (such as terminal amino-modified polyoxypropylene glycol and terminal-calboxylated polyoxypropylene glycol), polybutadienes having their terminals modified with hydroxyl groups, carboxyl groups or amino groups, hydrogenated polybutadienes, acrylonitrile-butadiene copolymers, and liquid terminal-functional group-containinig polymers such as acrylic polymers.

Solvent

When the composition of the present invention is used as a curing composition, a solvent may be added for the purpose of adjusting the viscosity or improving the storage stability of the composition. The amount of the solvent is preferably from 0 to 50 wt %, based on the polyether (A-2).

As such a solvent, aliphatic hydrocarbons, aromatic hydrocarbons, halogenated hydrocarbons, alcohols, ketones, esters, ethers, ester alcohols, ketone alcohols, ether alcohols, ketone ethers, ketone esters or ester ethers may be used. Especially when the composition of the present invention is to be stored for a long period of time, it is preferred to use alcohols, since the storage stability will be thereby improved.

As such alcohols, $C_{1-10}$ alkyl alcohols are preferred, and particularly preferred are methanol, ethanol, isopropanol, isoamyl alcohol and hexyl alcohol.

Dehydrating agent

Further, a small amount of a dehydrating agent may be added within a range not to adversely affect the curing property or the flexibility, in order to further improve the storage stability of the curing composition of the present invention. The amount of the dehydrating agent is preferably from 0 to 30 wt %, based on the polyether (A-2)

Specifically, an alkyl orthoformate such as methyl orthoformate or ethyl orthoformate, an alkyl orthoacetate such as methyl orthoacetate or ethyl orthoacetate, a hydrolyzable organic silicone compound such as methyltrimethoxy silane, vinyltrimethoxy silane, tetramethoxy silane or tetraethoxy silane, or a hydrolyzable organic titanium compound, may, for example, be used. Particularly preferred is vinyl trimethoxy silane or tetraethoxy silane from the viewpoint of the cost and the effects.

Thixotropic agent

A thixotropic agent may be used to improve the anti-sagging property. As such a thixotropic agent, hydrogenated castor oil or an aliphatic amide may, for example, be employed.

Aging preventive agent

Further, as an aging preventive agent, a commonly employed antioxidant, an ultraviolet absorber or a photostabilizer may suitably be employed. Various compounds of hindered amine type, benzotriazole type, benzophenone type, benzoate type, cyanoacrylate type, acrylate type, hindered phenol type, phosphorus type and sulfur type, may suitably be employed.

Further, for the purpose of improving the adhesion or the surface tuck of the coating material over a long period of time, an air oxidizable curable compound or a photocurable compound may sometimes be incorporated. The amount of the air oxidizable curable compound is preferably from 0 to 50 wt %, based on the polyether (A-2), and the amount of the photocurable compound is preferably from 0 to 50 wt %, based on the polyether (A-2).

Such an air oxidizable curable compound may, for example, be a drying oil such as tung oil or linseed oil, various alkyd resins obtained by modifying such a compound, an acrylic polymer modified by a drying oil, a silicone resin, a diene polymer such as polybutadiene, or a polymer or copolymer of $C_{5-8}$ diene, or various modified products (such as maleic modified products or boiled oil-modified products) of such polymers of copolymers. As the photocurable compound, a polyfunctional acrylate is usually employed.

Now, the present invention will be described in further detail with reference to Examples. However, it should be understood that the present invention is by no means restricted to such specific Examples. In these Examples, the molecular weight is a hydroxyl value based molecular weight.

Firstly, examples for producing alkenyl group-containing polyethers will be illustrated by Reference Examples 1 to 11.

REFERENCE EXAMPLE 1

To a polyoxypropylene polyol having a molecular weight of 20,000 obtained by polymerizing propylene oxide in the presence of a zinc hexacyanocobaltate catalyst using, as an initiator, a mixture of glycerol and ethylene glycol, sodium methoxide was added in an amount of one equivalent to the OH group of the polyoxypropylene polyol, followed by distilling off methanol under heating under reduced pressure to convert OH groups to ONa groups.

Then, allyl chloride was added in an amount of 1.05 equivalent to the ONa group, and reacted at 60° C. Then, non-reacted allyl chloride was distilled off under reduced pressure to obtain an alkenyl group-containing polyether containing sodium chloride together with a certain amount of alkali (hereinafter referred to as non-purified polyether a). This non-purified polyether a contained 130 ppm of zinc ion and 60 ppm of cobalt ion.

REFERENCE EXAMPLE 2

Using ethylene glycol as an initiator, propoxide was polymerized in the presence of a zinc hexacyanocobaltate catalyst to obtain a polymer having a molecular weight of 18,000. Then, sodium hydride was added in an amount of one equivalent to the OH group. Then, the mixture was heated to 80° C. to convert OH groups to ONa groups. Further, the reaction was continued while gradually adding a small amount of ethylene oxide at 100° C. to obtain a polymer having a molecular weight of 18,200 under a nitrogen atmosphere. Sodium methoxide was added in an amount of one equivalent to the OH group, and methanol was distilled off under heating under reduced pressure to convert OH groups to ONa groups.

The temperature was lowered to 70° C., and allyl chloride was added in an amount of 1.05 equivalent to the ONa group and reacted. Unreacted allyl chloride was distilled off under reduced pressure to obtain an alkenyl group-containing polyether containing sodium chloride together with a certain amount of alkali (hereinafter referred as non-purified polyether b). This non-purified polyether b contained 125 ppm of zinc ion and 55 ppm of cobalt ion.

REFERENCE EXAMPLE 3

Using butanol as an initiator, propylene oxide was polymerized in the presence of a zinc hexacyanocobaltate catalyst to obtain a polymer having a molecular weight of 4,000. Then, metal sodium was added in an amount of 1.05 equivalent to the OH group under a nitrogen atmosphere and reacted at 120° C. for 3 hours to convert OH groups to ONa groups.

Then, allyl chloride was added in an amount of 1.1 equivalent to the ONa group and reacted at 60° C. Then, unreacted ally chloride was distilled off under reduced pressure to obtain an alkenyl group-containing polyether containing sodium chloride together with a certain amount of alkali (hereinafter referred to as non-purified polyether c). This non-purified polyether c contained 130 ppm of zinc ion and 60 ppm of cobalt ion.

REFERENCE EXAMPLE 4

To a purified polyoxypropylene polyol having a molecular weight of 30,000 (zinc ion and cobalt ion being at most 2 ppm, respectively), sodium hydride in an amount of one equivalent to the OH group was reacted under a nitrogen atmosphere at 60° C. to covert OH groups to ONa groups. Then, allyl chloride were added in an amount of 1.05 equivalent to the ONa group and reacted at 60° C. Then, unreacted ally chloride was distilled off under reduced pressure to obtain an alkenyl group-containing polyether containing sodium chloride (hereinafter referred to as non-purified polyether d).

REFERENCE EXAMPLE 5

To a purified polyoxypropyleneoxyethylene diol having a molecular weight of 18,000 containing 2 wt % of polyoxyethylene at the terminal portions (zinc ion and cobalt ion being at most 2 ppm, respectively), sodium hydroxide powder was added in an amount of 1.5 equivalent to the OH group in a hydrogen atmosphere, and methallyl chloride was further added in an amount of 1.05 equivalent and reacted at 60° C. Unreacted methallyl chloride was distilled off under a reduced pressure to obtain an alkenyl group-containing polyether containing sodium chloride and sodium hydroxide (hereinafter referred to as non-purified polyether e).

REFERENCE EXAMPLE 6

To a purified polyoxypropylene monool having a molecular weight of 4,000 (zinc ion and cobalt ion being at most 2 ppm, respectively), metal sodium was added in an amount of 1.0 equivalent to the OH group under a nitrogen atmosphere and reacted at 120° C. for 3 hours. Further, ally chloride was added in an amount of 1.1 equivalent and reacted at 60° C. Then, unreacted allyl chloride was distilled off under reduced pressure to obtain an alkenyl group-containing polyether containing sodium chloride (hereinafter referred to as non-purified polyether f).

REFERENCE EXAMPLE 7

Using a glycerol-propylene oxide adduct having a molecular weight of 1,000 as an initiator, propylene oxide was polymerized in the presence of a zinc hexacyanocobaltate catalyst to obtain a polyoxypropylene polyol having a molecular weight of 15,000.

Then, the terminal was modified in the same manner as in Reference Example 1 to obtain an alkenyl group-containing polyether g containing 30 ppm of cobalt ion and 65 ppm of zinc ion together with a certain amount of alkali.

REFERENCE EXAMPLE 8

Using ethylene glycol as an initiator, propylene oxide was polymerized in the presence of a zinc hexacyanocobaltate catalyst to obtain a polyoxypropylene diol having a molecular weight of 12,000.

Then, the terminal was modified in the same manner as in Reference Example 1 to obtain an alkenyl group-containing polyether h containing 30 ppm of cobalt ion and 65 ppm of zinc ion together with a certain amount of alkali.

REFERENCE EXAMPLE 9

Using a pentaerythritol-propylene oxide adduct having a molecular weight of 1,000 as an initiator, propylene oxide was polymerized in the presence of a zinc hexacyanocobaltate catalyst to obtain a polyoxypropylene tetraol having a molecular weight of 17,000.

Then, the terminal was modified in the same manner as in Reference Example 1 to obtain an alkenyl group-containing polyether i containing 30 ppm of cobalt ion and 65 ppm of zinc ion together with a certain amount of alkali.

REFERENCE EXAMPLE 10

The polyoxypropylene diol obtained in Reference Example 8 and the polyoxypropylene triol obtained in Reference Example 7 were mixed in a weight ratio of 2 to 1 to obtain a mixed polyol.

Then, the terminal was modified in the same manner as in Reference Example 1 to obtain an alkenyl group-containing polyether j containing 30 ppm of cobalt ion and 65 ppm of zinc ion together with a certain amount of alkali.

REFERENCE EXAMPLE 11

The oxypropylene diol obtained in Reference Example 8 and the polyoxypropylene tetraol obtained in Reference Example 9 were mixed in a weight ratio of 4 to 1 to obtain a mixed polyol.

Then, the terminal was modified in the same manner as in Reference Example 1 to obtain an alkenyl group-containing polyether k containing 30 ppm of cobalt ion and 65 ppm of zinc ion together with a certain amount of an alkali.

Non-purified polyethers a to k obtained in Reference Examples 1 to 11, were purified. The pH of non-purified polyether c exceeded 12, but with respect to other polyethers, the pH was within a range of from 10 to 12.

EXAMPLE 1

100 g of non-purified polyether a was put into a glass reactor equipped with a stirrer, and 0.5 g of a polyoxyethyleneoxypropylene block copolymer (molecular weight; 10,000, containing 5 wt % of an oxyethylene chain), disodium dihydrogen pyrophosphate ($Na_2H_2P_2O_7$) in a total amount of 1.2 equivalent to the alkali compound contained in non-purified polyether a and 1.2 equivalent to the zinc ion contained in non-purified polyether a, and 5 g of water, were added thereto. The mixture was stirred at 90° C. for 2 hours. The mixture was maintained at 80° C., and nitrogen gas was supplied thereto to remove water. When water still remained at 2,000 ppm, 0.24 g of an adsorbent (aluminum magnesium oxide type synthetic adsorbent, KW-500SN, manufactured by Kyowa Kagaku Kogyo K.K.) was added thereto, and the mixture was stirred at 100° C. for one hour, and further dehydrated under reduced pressure. The temperature was adjusted to room temperature, and 100 g of hexane was added thereto. The mixture was stirred for 30 minutes and then subjected to filtration using a filter paper precoated with diatomaceous earth (celite). From the filtrate, the solvent was distilled off under reduced pressure, to obtain a pale yellow transparent oily substance (polyether a1).

EXAMPLE 2

100 g of non-purified polyether b was put into a glass reactor equipped with a stirrer, and disodium dihydrogen pyrophosphate in a total amount of 1.1 equivalent to the alkali compound contained in non-purified polyether b and 1.5 equivalent to the zinc ion contained in non-purified polyether b, and 3 g of water, were added thereto. The mixture was stirred at 80° C. for 2 hors. The mixture was maintained at 80° C. and nitrogen gas was supplied thereto to remove water.

When water still remained at 2,000 ppm, 0.24 g of an adsorbent (KW-500-SN) was added thereto, and the mixture was stirred at 100° C. for one hour and further dehydrated under reduced pressure. The temperature was adjusted to room temperature, and 100 g of hexane was added thereto. The mixture was stirred for 30 minutes and then subjected to filtration by using a filter paper precoated with celite. From the filtrate, the solvent was distilled off under reduced pressure, to obtain a pale yellow transparent oily substance (polyether b1). In the filtration step, the filtration speed during the treatment of 500 $kgm^{-2}$ was 1,150 $kgm^{-2}hr^{-1}$.

EXAMPLE 3

100 g of non-purified polyether c (pH=12.7) was put into a glass reactor equipped with a stirrer, and 1 g of a polyoxyethyleneoxypropylene block copolymer (molecular weight: 10,000, containing 12 wt % of an oxyethylene chain) and hydrochloric acid in an amount of 0.9 equivalent to the alkali compound contained in non-purified polyether c, were added thereto, and the pH was adjusted. Then, the disodium dihydrogen pyrophosphate in a total amount of 0.2 equivalent to the alkali compound contained in non-purified polyether c and 1.8 equivalent to the zinc ion contained in non-purified polyether c, and 5 g of water, were added thereto, and the mixture was stirred at 80° C. for 2 hours. The mixture was maintained at 80° C., and nitrogen gas was supplied to remove water.

When water still remained at 1,000 ppm, 0.24 g of adsorbent (magnesium silicate type synthetic adsorbent, KW-600, manufactured by Kyowa Kagaku Kogyo K.K.) was added, and the mixture was stirred at 100° C. for one hour. The temperature was adjusted to room temperature, and 40 g of hexane was added thereto. The mixture was stirred for 30 minutes and then subjected to filtration by using a filter paper precoated with celite. From the filtrate, the solvent was distilled off under reduced pressure to obtain a pale yellow transparent oily substance (polyether c1).

EXAMPLES 4 TO 6

100 g each of non-purified polyethers d to f was put into a glass reactor equipped with a stirrer, and 1 g of a polyoxyethyleneoxypropylene block copolymer (molecular weight: 10,000, containing 12 wt % of an oxyethylene chain), 0.12 g of disodium dihydrogen pyrophosphate corresponding to 1.8 equivalent to the alkali compound contained in each of non-purified polyesters d to f and 5 g of water, were added thereto. The mixture was stirred at 80° C. for 2 hours. The mixture was maintained at 80° C., and nitrogen gas was supplied to remove water. 0.24 g of an adsorbent (KW-500SN) was added thereto, and the mixture was stirred at 100° C. for one hour. The temperature was adjusted to room temperature, and 100 g of hexane was added thereto. The mixture was stirred for 30 minutes and then subjected to filtration by using a filter paper precoated with celite. From the filtrate, the solvent was distilled off under reduced pressure to obtain a pale yellow transparent oily substance (polyethers d1 to f1).

EXAMPLES 7 TO 11

Purification was carried out in the same manner as in Example 1 except that instead of non-purified polyether a, non-purified polyethers g to k were, respectively, used, to obtain pale yellow transparent oily substances (polyethers g1 to k1).

EXAMPLE 12

100 g of non-purified polyether b was put into a glass reactor equipped with a stirrer, and disodium dihydrogen pyrophosphate in a total amount of 1.1 equivalent to the alkali compound contained in non-purified polyether b and 1.45 equivalent to the zinc ion contained in non-purified polyether b, and 3 g of water, were added thereto. The mixture was stirred at 80° C. for 8 hours. The mixture was maintained at 80° C., and nitrogen gas was supplied to remove water.

When water still remained at 2,000 ppm, 0.24 g of an adsorbent (KW-500SN) was added thereto. The mixture was stirred at 100° C. for one hour and further dehydrated under reduced pressure. The temperature was adjusted to room temperature, and 100 g of hexane was added thereto. The mixture was stirred for 30 minutes and then subjected to filtration by using a filter paper precoated with celite to obtain pale yellow transparent oily substance. In the filtration step, the filtration speed during the treatment of 500 kgm$^{-2}$ was 7,500 kgm$^{-2}$hr$^{-1}$.

EXAMPLE 13

100 g of non-purified polyether b was put into a glass reactor equipped with a stirrer, and disodium dihydrogen pyrophosphate in a total amount of 1.1 equivalent to the alkali compound contained in non-purified polyether b and 1.5 equivalent to the zinc ion contained in non-purified polyether b, and 3 g of water, were added thereto. The mixture was stirred at 80° C. for 8 hours. The mixture was maintained at 80° C., and nitrogen gas was supplied to remove water.

When water still remained at 2,000 ppm, 0.24 g of an adsorbent (KW-500SN) was added thereto. The mixture was stirred at 100° C. for one hour and further dehydrated under reduced pressure. While the liquid temperature was at a high level, the mixture was subjected to filtration by using a filter paper precoated with celite to obtain a pale yellow transparent oily substance. In the filtration step, the filtration speed during the treatment at 500 kgm$^{-2}$ was 600 kgm$^{-2}$hr$^{-1}$.

EXAMPLE 14

100 g of non-purified polyether d was put into a glass reactor equipped with a stirrer, and 20 g of a hydrochloric acid aqueous solution containing hydrogen chloride in an amount of 1.05 equivalent to the alkali compound contained non-purified polyether d, was added thereto. The mixture was stirred at 60° C. for 2 hours. The mixture was heated to 80° C., and nitrogen gas was supplied to remove water. The temperature was adjusted to room temperature, and 100 g of hexane was added thereto. The mixture was stirred for 30 minutes and then subjected to filtration by using a filter paper precoated with celite, whereby the filtration property was extremely poor, and it was impossible to filtrate the entire amount. With respect to the solution which was filtered, the solvent was distilled off under reduced pressure to obtain a turbid oily substrate (polyether d2).

EXAMPLE 15

100 g of non-purified polyether c (pH=12.7) was put into a glass reactor equipped with a stirrer, and 1 g of a polyoxyethyleneoxypropylene block copolymer (molecular weight: 10,000, containing 12 wt % of an oxyethylene chain), disodium dihydrogen pyrophosphate in a total amount of 1.1 equivalent to the alkali compound contained in non-purified polyether c and 1.8 equivalent to the zinc ion contained in non-purified polyether c, and 5 g of water, were added thereto. The mixture was stirred at 80° C. for 2 hours. The mixture was maintained at 80° C., and nitrogen gas was supplied to remove water.

When water still remained at 2,000 ppm, 0.24 g of an adsorbent (KW-500SN) was added thereto. The mixture was stirred at 100° C. for one hour and further dehydrated under reduced pressure. The temperature was adjusted to room temperature and 100 g of hexane was added thereto. The mixture was stirred for 30 minutes and then subjected to filtration by using a filter paper precoated with celite, whereby the filtration property was extremely poor, and it was impossible to filtrate the entire amount. With respect to the solution which was filtered, the solvent was distilled off under reduced pressure to obtain a pale yellow slightly turbid oily substance (polyether g2).

With respect to the foregoing Examples, the obtained purified products were analyzed, and the results are shown in Tables 1 and 2. The measured values in Tables 1 and 2 were obtained by the following methods, respectively.

pH value: pH value of a solution having 10 g of the polyether dissolved in 60 cm$^3$ of a solvent mixture of isopropanol/deionized water (volume ratio: 60/40) adjusted to pH=7.

Na ion: analytical value by atomic absorption spectrometry

Zn ion: analytical value by ICP spectrometry

Co ion: analytical value by ICP spectrometry

Cl ion: using potassium chromate as an indicator, the Cl ion was determined by titration with an aqueous silver nitrate solution.

To each of the purified alkenyl group-containing polyethers (see Tables 3 and 4), chloroplatinic acid in the form of a 10% solution in isopropanol (5 ppm of chloroplatinic acid by weight to the polyether) was added and mixed, and then, methyldimethoxy silane was added in an amount of 80 mol % to the alkenyl group. The mixture was reacted at 70° C. to obtain a hydrolyzable group-containing silicon group-containing polyether.

The storage stability at 70° C. was evaluated. The results are shown in Tables 3 and 4. The viscosity (unit: cP) was measured by a BH type viscometer with a No. 6 rotor at 10 rotations at a temperature of 25° C. The viscosity after storage was measured with respect to a sample which was stored at 70° C. for 14 days and then left to cool to room temperature for from 12 to 24 hours.

EXAMPLE 16

To 100 parts by weight of a hydrolyzable group-containing silicon group-containing polyether obtained from purified polyether b1, 100 parts by weight of glue-like calcium carbonate having a particle size of 0.1 μm, 20 parts by weight of heavy-weight calcium carbonate having a particle size of 2 μm, 20 parts by weight of rutile-type titanium oxide, 50 parts by weight of a phthalate plasticizer, 5 parts by weight of a fatty acid amide type thixotropic agent, 1 part by weight of a benzotriazole type ultraviolet absorber, 1 part by weight of a hindered phenol type antioxidant and 1 part by weight of a hindered amine type photostabilizer were added, and the mixture was heated and dehydrated while being kneaded. Then, 3 parts by weight of vinyl trimethoxy silane, 1 part by weight of N-(β-aminoethyl)-γ-aminopropyltrimethoxy silane and 0.5 part by weight of γ-glycidyloxypropyltrimethoxy silane were added thereto, and the mixture was kneaded under a nitrogen atmosphere. Then, 2 parts by weight of an acetylacetonate type tin catalyst was added thereto, and the mixture was further kneaded to obtain a curable composition.

The composition was aged for 7 days at 20° C. under a humidity of 60% and 7 days at 50° C. under a humidity of 60%. The cured product had a 50% modulus of 3.0 kg/cm$^2$, a tensile strength of 9.0 kg/cm$^2$ and an elongation of 600%.

EXAMPLE 17

To 100 parts by weight of a hydrolyzable group-containing silicon group-containing polyether obtained from purified polyether b1, 120 parts by glue-like calcium carbonate having a particle size of 0.1 μm, 20 parts by weight of heavy weight calcium carbonate having a particle size of 2 μm, 50 parts by weight of a phthalate type plasticizer, 5 parts by weight of a bisphenol A type epoxy resin, 3 parts by weight of a hydrogenated caster oil type thixotropic agent, 3 parts by weight an acrylate type photocurable resin, 3 parts by weight of a fatty acid epoxy type plasticizer, 3 parts by weight of drying oil, 1 part by weight of a benzotriazole type ultraviolet absorber, 1 parts by weight of a hindered phenol type antioxidant, 1 part by weight of a hindered amine type photostabilizer and 3 parts by weight of phenoxytrimethoxy silane were added, and the mixture was kneaded under a nitrogen atmosphere to obtain a main composition.

On the other hand, 3 parts by weight of tin octylate, 0.5 part by weight of lauryl amine, 20 parts by weight of a phthalate type plasticizer and 20 parts by weight of kaolin were mixed to obtain a curing composition.

The main composition and the curing composition were mixed and aged for 7 days at 20° C. under a humidity of 60% and 7 days at 50° C. under a humidity of 60%, to obtain a cured product. The cured product had a 50% modulus of 1.8 kg/cm$^2$, a tensile strength of 6.0 kg/cm$^2$ and an elongation of 600%.

TABLE 2

|  | Example 9 | Example 10 | Example 11 | Example 14 | Example 15 |
|---|---|---|---|---|---|
| Non-purified polyether | i | j | k | d | g |

TABLE 2-continued

|  | Example 9 | Example 10 | Example 11 | Example 14 | Example 15 |
|---|---|---|---|---|---|
| Purified polyether | i1 | j1 | k1 | d2 | g2 |
| pH value | 6.9 | 6.9 | 6.9 | 6.8 | 6.9 |
| Zn ion | <1 | <1 | <1 | 40 | <1 |
| Na ion | 5 | 3 | 3 | 220 | 150 |
| Co ion | <1 | <1 | <1 | 5 | <1 |
| Cl ion | 8 | 5 | 5 | 330 | 225 |

TABLE 3

| Purified polyether | a1 | b1 | c1 | d1 | e1 | f1 | g1 |
|---|---|---|---|---|---|---|---|
| Initial viscosity | 20000 | 16000 | 2800 | 26000 | 16000 | 2800 | 6500 |
| Viscosity after storage | 20000 | 16000 | 2800 | 26000 | 16000 | 2800 | 6500 |

TABLE 4

| Purified polyether | h1 | i1 | j1 | k1 | d2 | g2 |
|---|---|---|---|---|---|---|
| Initial viscosity | 7500 | 5500 | 7200 | 7100 | 30000 | 6500 |
| Viscosity after storage | 7500 | 5500 | 7200 | 7100 | 39000 | 7000 |

As shown by the Examples, according to the present invention, it is possible to obtain polyethers containing no substantial residual salts (such as alkali metal salts, cobalt salts, zinc salts, etc.).

Hydrolyzable group-containing silicon group-containing polyethers produced from the unsaturated group-containing polyethers having littler residual salts, obtained the process of the present invention, contain little residual salts. Accordingly, curable compositions using such hydrolyzable group-containing silicon group-containing polyethers, have extremely good storage stability.

TABLE 1

|  | Example 1 | Example 2 | Example 3 | Example 4 | Example 5 | Example 6 | Example 7 | Example 8 |
|---|---|---|---|---|---|---|---|---|
| Non-purified polyether | a | b | c | d | e | f | g | h |
| Purified polyether | a1 | b1 | c1 | d1 | e1 | f1 | g1 | h1 |
| pH value | 6.9 | 7.2 | 7.1 | 6.85 | 6.78 | 6.9 | 6.9 | 6.9 |
| Zn ion | <1 | <1 | <1 | <1 | <1 | <1 | <1 | <1 |
| Na ion | 2 | 3 | 2 | 3 | 2 | 3 | 3 | 4 |
| Co ion | <1 | <1 | <1 | <1 | <1 | <1 | <1 | <1 |
| Cl ion | 3 | 5 | 3 | 5 | 3 | 5 | 5 | 6 |

What is claimed is:

1. A curable composition containing a hydrolyzable group-containing silicon group-containing polyether prepared by the process of which comprises adding to a polyether (A-1) containing a first salt, water (B) and a compound (C) which is capable of reacting with an ion constituting the first salt to form a second salt which is essentially insoluble in the polyether (A-1), then removing water, followed by removing the second salt from the polyether (A-1) to purify the polyether (A-1), and then reacting thereto a silicon compound (E) containing a silicon atom to which a hydrogen atom and a hydrolyzable group are directly bonded, in the presence of a catalyst comprising a Group 8 metal or its compound, wherein the polyether (A-1) is an unsaturated group-containing polyether obtained by reacting a monoepoxide to an initiator in the presence of a metal catalyst to obtain a hydroxyl group-containing polyether, then converting the hydroxyl group-containing polyether to an alkali metal alkoxide, followed by reacting an unsaturated group-containing halogenated hydrocarbon thereto.

2. A curable composition containing a hydrolyzable group-containing silicon group-containing polyether wherein the total amount of ionic impurities is at most 50 ppm.

* * * * *

UNITED STATES PATENT AND TRADEMARK OFFICE
CERTIFICATE OF CORRECTION

PATENT NO. : 5,973,096

DATED : October 26, 1999

INVENTOR(S): Takashi WATABE et al.

It is certified that an error appears in the above-identified patent and that said Letters Patent is hereby corrected as shown below:

On the title page, item [62], the Related U.S. Application Data is incorrectly listed. It should be:

--Related U.S. Application Data

[62] Division of application No. 08/503,211, Jul. 17, 1995, Pat. No. 5,811,566.--

Signed and Sealed this

Thirteenth Day of February, 2001

*Attest:*

NICHOLAS P. GODICI

*Attesting Officer*    *Acting Director of the United States Patent and Trademark Office*